United States Patent
Belanger, Jr. et al.

(10) Patent No.: US 7,701,080 B2
(45) Date of Patent: Apr. 20, 2010

(54) USB FOR VEHICLE APPLICATION

(75) Inventors: Thomas D. Belanger, Jr., Saline, MI (US); Susan Verellen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/674,311

(22) Filed: Feb. 13, 2007

(65) Prior Publication Data
US 2008/0191551 A1   Aug. 14, 2008

(51) Int. Cl.
*B60L 1/00* (2006.01)
*B60L 3/00* (2006.01)
*H02G 3/00* (2006.01)

(52) U.S. Cl. .................................... 307/10.1
(58) Field of Classification Search ............... 307/10.1, 307/9.1
See application file for complete search history.

(56) References Cited

U.S. PATENT DOCUMENTS

| | | | |
|---|---|---|---|
| 6,612,875 B1 | 9/2003 | Liao | |
| 6,614,206 B1 | 9/2003 | Wong et al. | |
| 6,633,932 B1 | 10/2003 | Bork et al. | |
| 6,741,064 B2 | 5/2004 | Liu et al. | |
| 6,936,936 B2 | 8/2005 | Fischer et al. | |
| 7,094,089 B2 * | 8/2006 | Andre et al. | 439/218 |
| 2005/0151422 A1 | 7/2005 | Gilmour | |
| 2007/0220287 A1 * | 9/2007 | Sang-Heon | 713/300 |
| 2007/0290555 A1 * | 12/2007 | Caren | 307/31 |

OTHER PUBLICATIONS

Casco, Part 212700 Lighter Adapter, 1 page, www.cascoglobal.com.
USBIF, Universal Serial Bus, Application Specific Connector Addendum, PlusPower, Electro-Mechanical Specification Version 0.8f, 1999, 26 pages.
Tyco Electronics, Polyswitch Resettable Devices, http://www.circuitprotection.com/faqs.asp, pp. 1-5.

* cited by examiner

*Primary Examiner*—Albert W Paladini
*Assistant Examiner*—Carlos Amaya
(74) *Attorney, Agent, or Firm*—Franklin MacKenzie; Ford Global Technologies, LLC

(57) ABSTRACT

A power data connection for a vehicle and one or more electronic devices is provided. The power data connection comprises a data communication connector and a terminal. The data communication connector includes a case ground and is adapted to enable data communication to and from the vehicle. The terminal is supported by the case ground and operable to supply electrical power from the vehicle to the electronic devices simultaneously with the data communication connector enabling data communication to and from the vehicle.

16 Claims, 3 Drawing Sheets

USB FOR VEHICLE APPLICATION

BACKGROUND

1. Technical Field

The embodiments of the present invention generally relate to a power and data communication connection in a vehicle.

2. Background Art

A number of vehicles produced today include a power point connection for providing power to any number of electrical devices brought into a vehicle by a user. Such devices may include a cell phone, portable DVD player, personal laptops, compact disc players, etc. The power point connection comprises a power point plug and receptacle positioned in the instrument panel of the vehicle or other interior portion of the vehicle. The power point connection is coupled to a power supply in the vehicle. In the past, these power point connections were used to heat cigarette lighters when automakers provided such lighters in vehicles. Conventional power point connections are large and consume a large amount of surface area on the instrument panel or other portion in the interior of the vehicle. For example, the power point connection may consume 30 mm to 40 mm of space on the dash panel or on other interior trim pieces to allow for customer usage. Conventional power point connections are limited to providing power for charging and powering up the electrical devices brought into the vehicle by the user.

With the advent of data communication protocols and the use of such communication with any number of electrical devices, automakers today may be compelled to provide an architecture that supports a data communication protocol while continuing to provide an ample amount of power needed to charge and operate the electronic devices. Universal Serial Bus (USB) protocols have become prevalent on a number of consumer electronic devices. Such devices may include laptops, personal digital assistants (PDAs), digital cameras, MP3 players, mouses, keyboards, cell phones, printers, fax machines, etc. While the use of USB has become prevalent, the USB protocol is limited in the amount of power that can be provided to any one or more electronic devices via a USB connector. Due to such limitations, the USB connector cannot be used to power and/or charge a number of the electronic devices generally coupled to a vehicle through the power point connection.

Accordingly, it would be desirable to provide a combined power data connection for supporting data communication between electronic devices coupled to a vehicle and for providing higher power requirements in order to charge and power the electronic devices. It would also be desirable to reduce the size of the power point connection to preserve space on the instrument panel and/or other trim pieces which support power point connections used in vehicles today.

SUMMARY

In one non-limiting embodiment, a power data connection for a vehicle and one or more electronic devices is provided. The power data connection comprises a data communication connector and a terminal. The data communication connector includes a case ground and is adapted to enable data communication to and from the vehicle. The terminal is supported by the case ground and operable to supply electrical power from the vehicle to the electronic devices simultaneously with the data communication connector enabling data communication to and from the vehicle.

In another non-limiting embodiment, a power data connection for allowing the transfer of electrical power from a power supply and data between one or more electronic devices is provided. The power data connection comprises a data communication connector, a terminal and a circuit breaker. The data communication connector includes a case ground and is adapted to enable data communication to and from the electrical devices. The terminal is supported by the case ground and is operable to supply electrical power from the power supply to the electronic devices simultaneously with the data communication connector enabling data communication between the electronic devices. The circuit breaker is operable to disconnect the electrical power from the terminal to the electrical devices while continuing to allow the data communication connector to enable data communication between the electrical devices.

In another non-limiting embodiment, a power data connection for a vehicle and one or more electrical devices is provided. The power data connection comprises a Universal Serial Bus (USB) connector. The USB connector includes a case ground and is adapted to enable data communication to and from the vehicle and the case ground includes interior and exterior portions. The terminal is supported by the exterior portion of the case ground and is operable to supply electrical power from the vehicle to the electronic devices simultaneously with the USB connector enabling data communication to and from the vehicle.

DETAILED DESCRIPTION OF THE PREFERRED EMBODIMENT(S)

Figure 1:
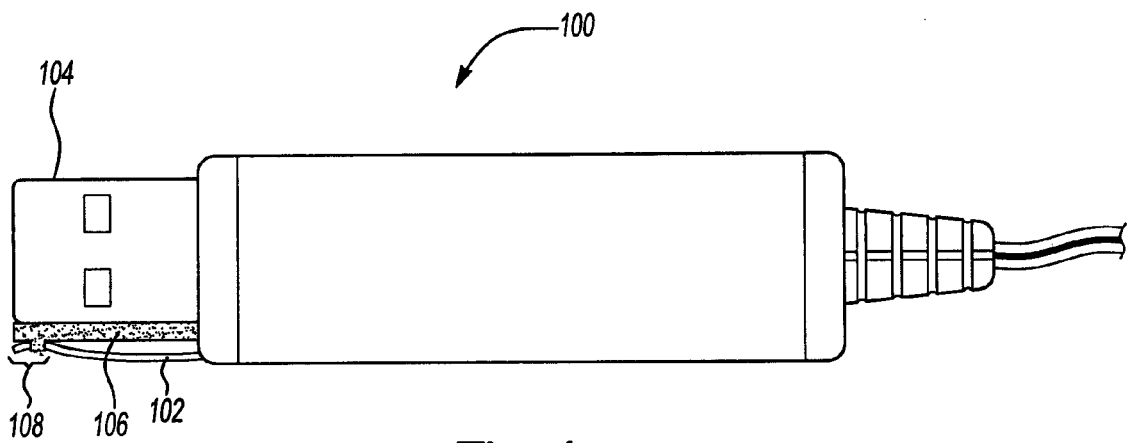
FIG. 1 illustrates a data communication connector in accordance with one embodiment of the present invention.

Referring to FIG. 1, a diagram of a data communication connector 100 is shown in accordance to one embodiment of the present invention. The data communication connector 100 includes a terminal 102 and a case ground 104. The case ground 104 includes interior and exterior portions. The terminal 102 is supported by the exterior portion of the case ground 104 and is generally flexible. Baseline circuitry (not shown) is positioned in the interior portion of the case ground 104 and is configured to provide baseline electrical power to electronic devices and transfer digital data to and from electronic devices. The terminal 102 and the case ground 104 act together to provide an additional power level for one or more electronic devices coupled to the data communication connector 100 while allowing the baseline circuitry of the data communication connector to continue to allow for data communication between the electronic devices. In one non-limiting example, if a dedicated ground is needed in addition to the case ground 104, the dedicated ground can be added to the other side of the exterior portion of the case ground 104 opposite to the terminal 102.

A spacer 106 is positioned between the terminal 102 and the case ground 104 for insulating the terminal 102 from the case ground 104. The spacer 106 may be made of any non-conductive material. In one non-limiting example, the spacer 106 may be made of plastic or rubber. The type of material used to construct the spacer 106 may be varied to meet the design criteria of a particular implementation. The spacer 106 may be coupled to the exterior portion of the case ground 104 by adhesive or glue. In general, the spacer 106 may be coupled to the case ground 104 a number of different ways. The particular attachment method used to couple the spacer 106 to the case ground 104 may be varied to meet the design criteria of a particular implementation. The spacer 106 includes a locking arrangement 108 for coupling the terminal 102 to the spacer 106.

Figure 2:
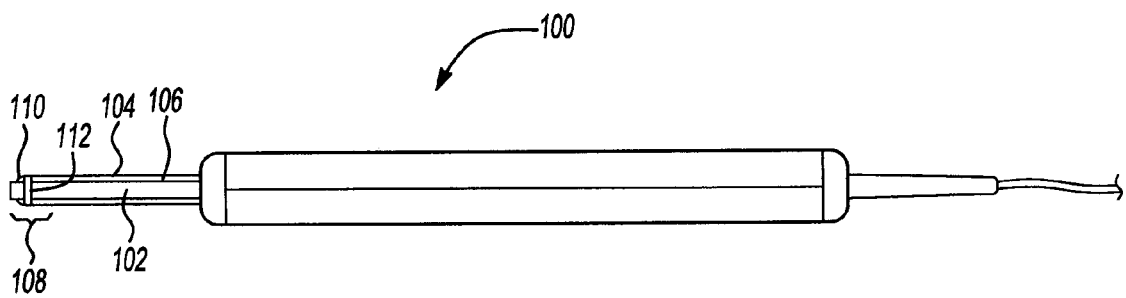
FIG. 2 illustrates a top view of the data communication connector.

FIG. 2 generally illustrates a top view of the data communication connector 100. The locking arrangement 108 includes a retaining rib 110 and a channel 112. The channel 112 is positioned below the retaining rib 110. An end of the terminal 102 is disposed in the channel 112 of the spacer 106. To couple the terminal 102 to the spacer 106, an end of the terminal 102 maybe positioned in the channel 112 of the spacer 106 and underneath the retaining rib 110. The particular position of the retaining rib 110 and the channel 112 on the spacer 106 may be varied to meet the design criteria of a particular implementation. In one non-limiting example, the locking arrangement 108 may be an adhesive that is applied to a portion of the terminal in order to couple the terminal 102 to the spacer 106. In general, the locking arrangement 108 is configured to ensure that the terminal 102 stays in a particular orientation while the data communication connector 100 is being mated.

Figure 3:
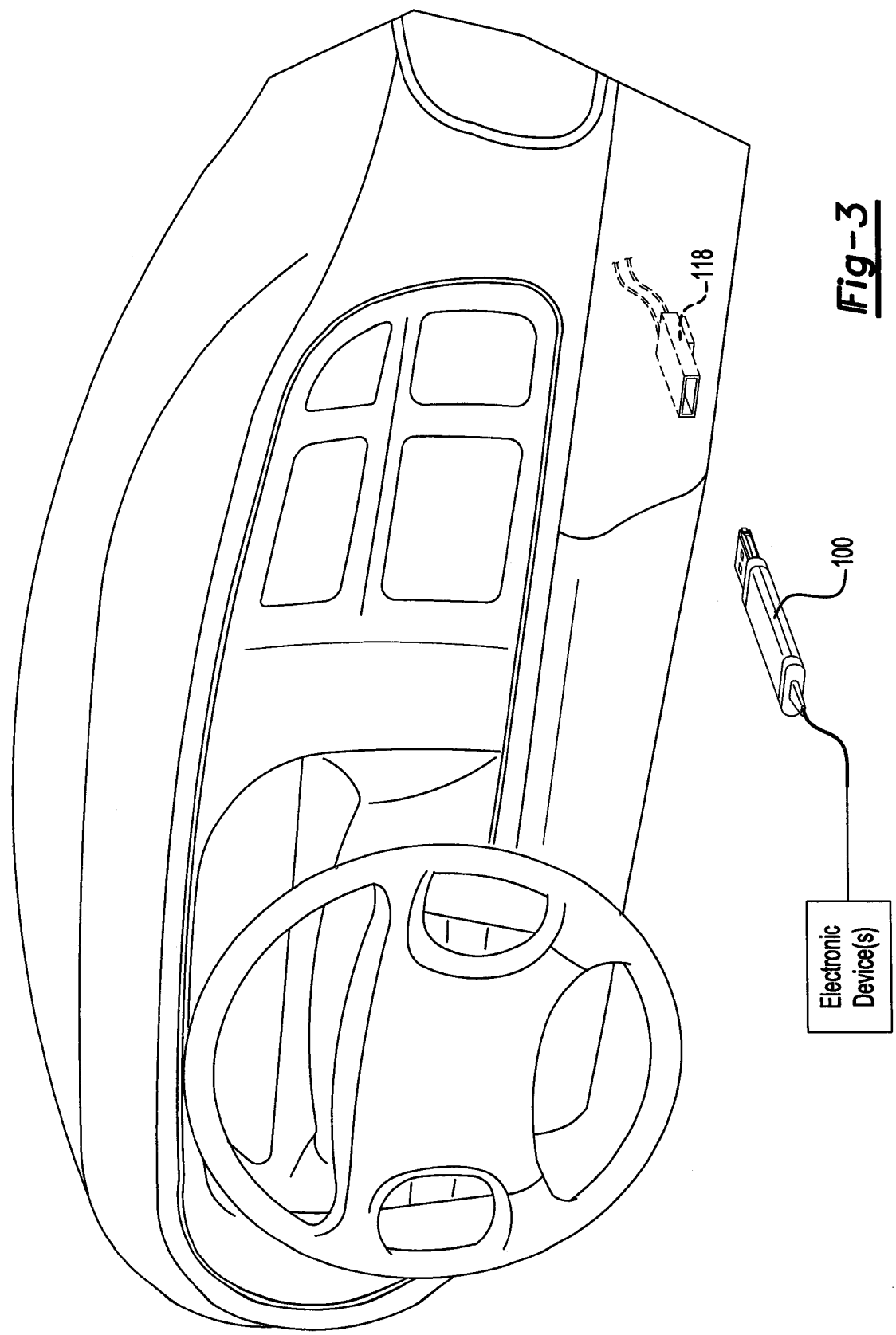
FIG. 3 illustrates a power data connection in accordance with one embodiment of the present invention positioned in an instrument panel.

Referring to FIG. 3, a diagram of a power data connection is shown in accordance to one embodiment of the present invention. The power data connection includes a socket 118 and the data communication connector 100. While FIG. 3 generally illustrates the power data connection positioned in the instrument panel of the vehicle, the power data connection may be positioned in any location in the vehicle. In one non-limiting example, the power data connection may be disposed in a center console (not shown) of the vehicle. In another non-limiting example, the power data connection may be positioned in the interior trim located on the front driver and passenger doors. The particular location of the power data connection in the vehicle may be varied to meet the design criteria of a particular implementation. The data communication connector 100 and the socket 118 may include any number of indexing arrangements to ensure that the data communication connector 100 is mated with the socket 118 in the desired orientation. Such indexing arrangements may ensure that the terminal 102 does not come into contact with the ground terminal 124 when the data communication connector 100 is mated to the socket 118.

Figure 4:
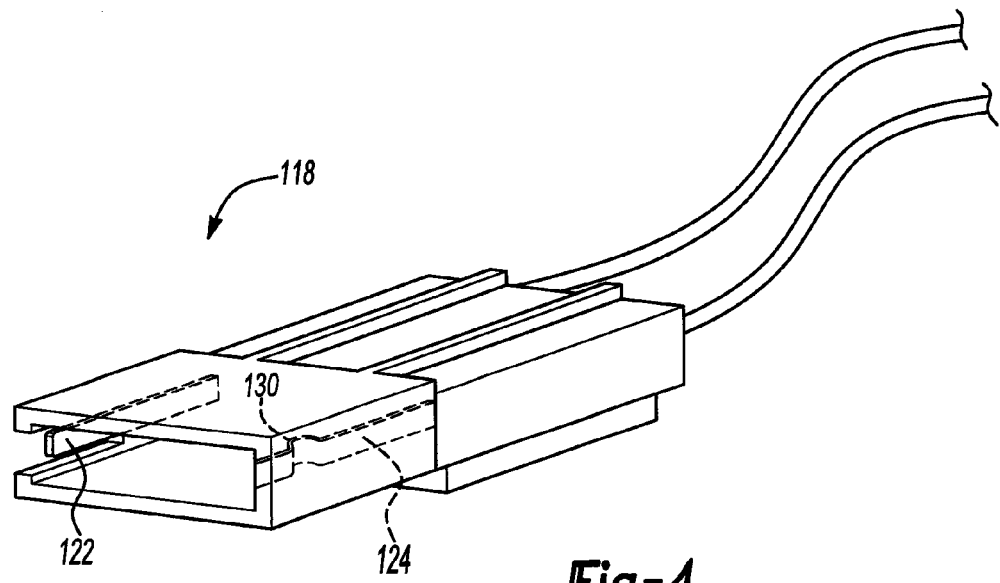
FIG. 4 illustrates a socket in accordance with one embodiment of the present invention.

Referring to FIG. 4, a diagram of the socket 118 is shown in accordance to one embodiment of the present invention. As noted in connection with FIG. 3, the socket 118 may be positioned in any number of areas in the vehicle. The socket 118 includes a power terminal 122 and a ground terminal 124. The power terminal 122 of the socket 118 is configured to slideably engage the terminal 102 and the ground terminal 124 of the socket 118 is configured to slideably engage the case ground 104. The ground terminal 124 may be coupled to any number of grounds located throughout the vehicle. The power terminal 122 may be coupled to a high current positive source such as a battery feed. The battery feed may be a 12 volt power feed. The power terminal 122 may pass the 12V feed to the terminal 102. The terminal 102 enables the data communication connector 100 to provide for an increased power level when compared to the base line power provided by the base line circuitry of the data communication connector 100. In one non-limiting example, the terminal 102 maybe configured to provide up to 10A of current to any one or more electronic devices coupled to the data communication connector 100. The baseline circuitry of the data communication connector 100 may be limited to providing up to 3A of current.

In one non-limiting example, the data communication connector 100 may be implemented as a Universal Serial Bus (USB) connector. The USB connector generally includes a two level pin interface and is configured to provide baseline power of 2.5 Watts. The terminal 102 is configured to add up to 120 Watts of power in addition to the 2.5 Watts of power provided by the data communication connector 100. The power terminal 102 may have a current rating of up to 10 Amps.

Figure 5:
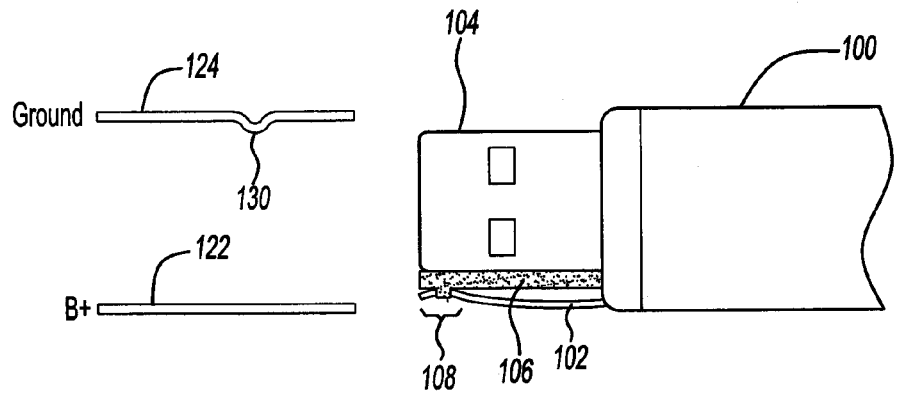
FIG. 5 illustrates a power data connection in accordance with one embodiment of the present invention.

Referring to FIG. 5, a power data connection in accordance to one embodiment of the present invention is shown. As noted in connection with FIG. 4, the ground terminal 124 slideably engages the case ground 104 for establishing ground and the power terminal 122 slideably engages the terminal 102. The ground terminal 124 includes a curved portion 130. The curved portion 130 is configured to flex toward the power terminal 122. As a user inserts the data communication connector 100 into the socket 118, the curved portion 130 is positioned along the ground terminal 124 such that contact is made between the curved portion 130 and the case ground 104 prior to contact being made between the terminal 102 and the power terminal 122. Such a configuration isolates the terminal 102 from the ground and eliminates the potential of shorting the terminal 102 to ground. The curved portion 130 also reduces the occurrence of an electrostatic discharge (ESD) from taking place when any one or more of the electronic devices are coupled to the vehicle via the power data connection.

While the terminal 102 is coupled to the spacer 106 via the locking arrangement 106, a portion of the terminal 102 flexes outward from the spacer 106 in a manner such that the flexed portion of the terminal 102 applies a force against the power terminal 122 to ensure contact with the power terminal 122 when the data communication connector 100 is mated to the socket 118.

Figure 6:
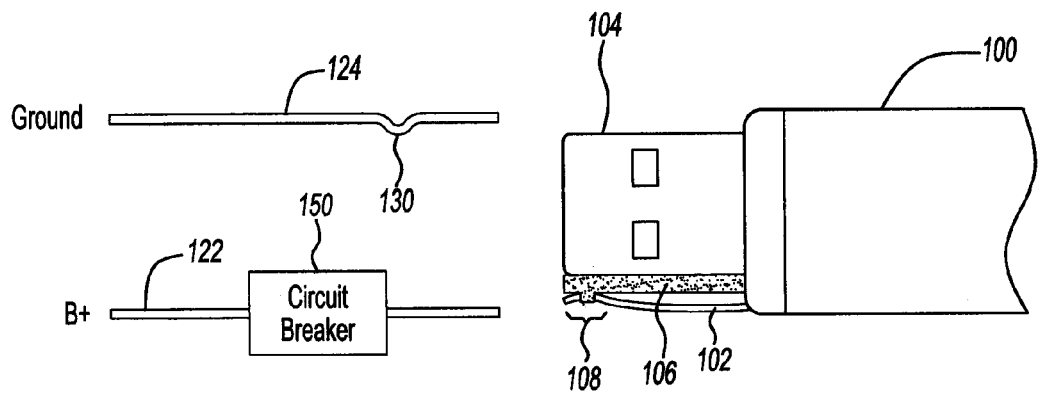
FIG. 6 illustrates the power data connection with a circuit breaker positioned in the socket.

Referring to FIG. 6, a diagram illustrating the power data connection having a circuit breaker in accordance to one embodiment of the present invention is shown. A circuit breaker 150 is placed in series with the power terminal 122. The circuit breaker 150 disconnects the battery power supply from the power terminal 122 in the event too much current is being drawn. The data communication connector 100 may continue to provide baseline power and enable data communication between one or more electronic devices and the vehicle when the circuit breaker 150 disconnects the battery power supply from the power terminal 122.

Figure 7:
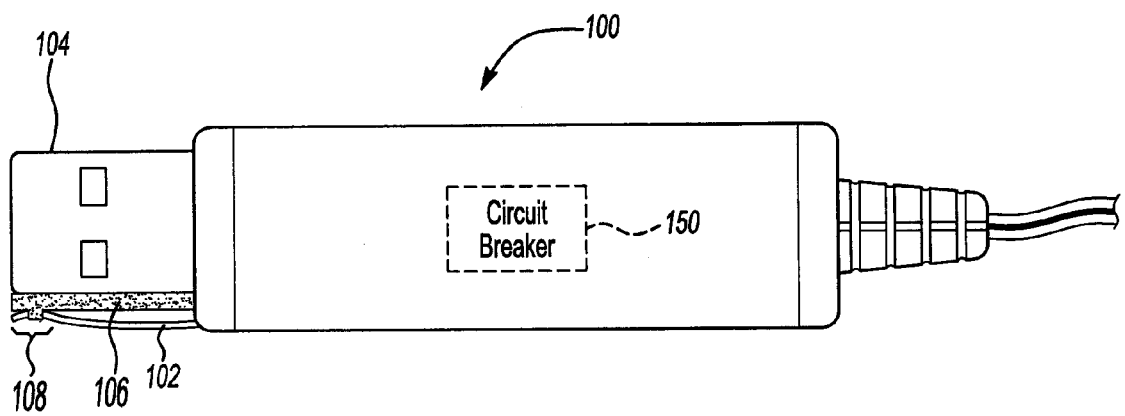
FIG. 7 illustrates the data connection connector with a circuit breaker.

Referring to FIG. 7, a diagram illustrating the power data connection having a circuit breaker in accordance to another embodiment of the present invention is shown. The circuit breaker 150 may be positioned about the data communication connector 100 and placed in series with the terminal 102. The circuit breaker 150 disconnects the battery power supply from the terminal 102 in the event too much current is being drawn. The data communication connector 100 may continue to provide baseline power and enable data communication between one or more electronic devices and the vehicle when the circuit breaker 150 disconnects the battery power supply from the terminal 102.

In one non-limiting example, the circuit breaker 150 may be implemented as a resettable fuse-based circuit breaker. In another non-limiting example, the circuit breaker 150 may be implemented as a resettable positive thermal coefficient (PTC) circuit breaker. The PTC circuit breaker may be positioned about the terminal 102 or the power terminal 122 in such a manner such that the PTC detects the amount of current that is passed between the terminal 102 or the power terminal 122 as electrical power is being transmitted from the power source to any one or more of the electronic devices. In the event the PTC circuit breaker detects that too much current is being passed through the terminal 102 or the power terminal 122, the PTC circuit breaker includes a polymer matrix that expands as more heat is conducted due to the increased current consumption taking place between the terminal 102 and the power terminal 122. The resistance of the PTC circuit breaker increases as the amount of heat detected increases. In response to such increased current consumption, the PTC circuit breaker attains a high resistance level and prevents further current draw.

While the best mode for carrying out the invention has been described in detail, those familiar with the art to which this invention relates will recognize various alternative designs and embodiments for practicing the invention as defined by the following claims.

What is claimed:

1. A power data connection for a vehicle and one or more electronic devices, the connection comprising:
   a data communication connector having a case ground and configured to enable data communication to and from the vehicle;
   a terminal supported on the case ground and operable to supply electrical power from the vehicle to the electronic devices simultaneously with the data communication connector enabling data communication to and from the vehicle; and
   a socket having power and ground terminals disposed in the vehicle interior and the power terminal is adapted to slideably engage the terminal and the ground terminal is adapted to slideably engage the case ground, said ground terminal including a curved portion that is flexed inward in such a manner to allow contact to be made between the ground terminal and the case ground first before contact is made between the terminal and the power terminal when the ground terminal engages the case ground and the power terminal engages the terminal.

2. The power data connection of claim 1, wherein the case ground includes interior and exterior portions and the terminal is supported on the external portion of the case ground.

3. The power data connection of claim 2, wherein the interior portion of the case ground surrounds baseline circuitry to provide baseline power associated with the data communication and to enable data communication between the electrical devices and the vehicle.

4. The power data connection of claim 2 further comprising a spacer positioned on the exterior portion of the case ground and configured to receive the terminal and to prevent the terminal from contacting the case ground.

5. The power data connection of claim 4, further comprising a locking arrangement positioned on the spacer to couple the terminal to the spacer.

6. The power data connection of claim 1, wherein the terminal is flexible and a portion of the terminal is flexed outward in such a manner to allow the terminal to apply a locking force against the power terminal while mating the data communication connector with the socket.

7. The power data connection of claim 1, further comprising a circuit breaker disposed about the terminal and operable to disconnect electrical power from the terminal to the electrical devices while continuing to allow the data communication connector to enable data communication to and from the vehicle.

8. The power data connection of claim 1, further comprising a circuit breaker disposed about the socket and operable to disconnect electrical power from the terminal to the electrical devices while continuing to allow the data communication connector to enable data communication to and from the vehicle.

9. The power data connection of claim 1, wherein the data communication connector includes a Universal Serial Bus (USB) connector.

10. The power data connection for a vehicle and one or more electrical devices of claim 1, the data communication connector comprising:
    a Universal Serial Bus (USB) connector having a case ground and adapted configured to enable data communication to and from the vehicle and the case ground having interior and exterior portions; and
    a terminal physically supported on the exterior portion of the case ground and operable to supply electrical power from the vehicle for powering the electronic devices simultaneously with the USB connector enabling data communication to and from the vehicle.

11. The power data connection of claim 10 further comprising a spacer positioned on the exterior portion of the case ground and configured to retain the terminal and to prevent the terminal from contacting the case ground.

12. A power data connection for allowing the transfer of electrical power from a power supply and data between one or more electronic devices, the power data connection comprising:
    a data communication connector having a case ground and adapted configured to enable data communication to and from the electrical devices;
    a terminal supported on the case ground and operable to supply electrical power from the power supply for powering the electronic devices simultaneously with the data communication connector enabling data communication between the electronic devices;
    a circuit breaker operable to disconnect the electrical power from the terminal to the electrical devices while continuing to allow the data communication connector to enable data communication between the electrical devices and
    a socket having power and ground terminals disposed in the interior of the vehicle and the power terminal is adapted to slideably engage the terminal and the ground terminal is adapted to slideably engage the case ground, said ground terminal includes a curved portion that is flexed inward in such a manner to allow contact to be made between the ground terminal and the case ground prior to contact being made between the terminal and the power terminal.

13. The power data connection of claim 12, wherein the case ground includes interior and exterior portions and the terminal is supported on the external portion of the case ground.

14. The power data connection of claim 13, wherein the interior portion of the case ground surrounds baseline circuitry to provide baseline power associated with the data communication and to enable data communication between the electrical devices.

15. The power data connection of claim 13 further comprising a spacer positioned on the exterior portion of the case ground and configured to receive the terminal and to prevent the terminal from contacting the case ground.

16. The power data connection of claim 12, wherein the terminal is flexible and a portion of the terminal is flexed outward in such a manner to allow the terminal to apply a locking force against the power terminal while mating the data communication connector and the socket.

* * * * *